United States Patent [19]

Schramm et al.

[11] Patent Number: 5,160,881
[45] Date of Patent: Nov. 3, 1992

[54] ALTERNATOR FOR A MOTOR VEHICLE HAVING A VENTILATOR AND DEVICE FOR MONITORING AND CONTROLLING THE VENTILATOR

[75] Inventors: Guenter Schramm, Vaihingen-Enzweihingen; Walter Kohl, Bietigheim; Friedhelm Meyer, Illingen, all of Fed. Rep. of Germany

[73] Assignee: Robert Bosch GmbH, Stuttgart, Fed. Rep. of Germany

[21] Appl. No.: 671,863

[22] PCT Filed: May 17, 1990

[86] PCT No.: PCT/DE90/00367

§ 371 Date: Apr. 1, 1991

§ 102(e) Date: Apr. 1, 1991

[87] PCT Pub. No.: WO91/02397

PCT Pub. Date: Feb. 21, 1991

[30] Foreign Application Priority Data

Aug. 4, 1989 [DE] Fed. Rep. of Germany ....... 3925793

[51] Int. Cl.$^5$ .................... H02H 7/06; B60R 16/02; H02K 9/04; H02K 9/24
[52] U.S. Cl. .......................................... 322/7; 322/33; 322/DIG. 1; 318/140
[58] Field of Search ...................... 310/12, 63; 322/33, 322/34, DIG. 1, 7; 318/140

[56] References Cited

U.S. PATENT DOCUMENTS

| | | | |
|---|---|---|---|
| 4,162,419 | 7/1979 | De Angelis | 310/62 X |
| 4,450,389 | 5/1984 | Frister | 322/29 X |
| 4,564,775 | 1/1986 | Mazzorana | 310/62 |

FOREIGN PATENT DOCUMENTS

| | | |
|---|---|---|
| 3231152 | 8/1983 | Fed. Rep. of Germany . |
| 1454558 | 10/1966 | France . |
| 2301123 | 9/1976 | France . |
| 2515893 | 5/1983 | France . |
| 90163 | 8/1921 | Switzerland . |

Primary Examiner—R. J. Hickey
Attorney, Agent, or Firm—Michael J. Striker

[57] ABSTRACT

Fresh air from an area located outside of the engine compartment is supplied to an alternator in a motor vehicle by ventilator. The ventilator is supplied with voltage from the alternator power supply system, and since a failure of the ventilator could lead to destruction of the alternator due to heat, the functioning of the ventilator is monitored by a device or circuit for monitoring and/or controlling the ventilator. This circuit also has a device for self-checking and controls the additional ventilator as a function of the alternator temperature by a device for measuring alternator temperature electrically connected to it.

12 Claims, 4 Drawing Sheets

ALTERNATOR FOR A MOTOR VEHICLE HAVING A VENTILATOR AND DEVICE FOR MONITORING AND CONTROLLING THE VENTILATOR

BACKGROUND OF THE INVENTION

The invention is directed to an alternator with an added ventilator, particularly a three-phase alternator for motor vehicles in which the air flow of the added ventilator serves to cool the alternator, and wherein the added ventilator is supplied with voltage by the alternator.

In internal combustion engines which are operated over a very great speed range and in which high demands are made on alternator outputs, it must be ensured for reasons relating to temperature that the alternator is cooled with fresh air by means of an additional ventilator. This fresh air can be supplied e.g. via a hose line from an area located outside the engine space.

Alternators with external ventilation, in which the alternator is additionally cooled by means of a fan, are already known in principle. Thus, for example, an externally ventilated three-phase alternator is known from DE-OS 32 31 152 in which the fan is driven by means of a three-phase asynchronous motor whose squirrel-cage rotor is securely coupled with the fan. In so doing, the stationary windings of the asynchronous motor are connected, via a switch, to the a.c. windings of the alternator for the power supply. However, a monitoring of the functioning of the asynchronous motor, and accordingly of the fan, is not provided; the alternator can accordingly be destroyed by thermal overloading in the event that the fan does not start as desired.

SUMMARY OF THE INVENTION

According to the invention, the alternator with the ventilator is provided with a device for monitoring and/or controlling the ventilator. Advantageously this device can be structured to check its own operability.

The alternator with the ventilator, according to the invention, has the advantage over the known alternator that the functioning of the ventilator is constantly monitored and that the device for monitoring the functioning of the ventilator monitors itself by means of a self-diagnosis. Defects in the operativeness of the ventilator and of the device for monitoring the ventilator are displayed.

Further, defects in the wiring or a separation or breakage of a line are also displayed.

In another construction of the invention, the device for monitoring the operativeness of the ventilator is further developed in such a way that the control of the ventilator can be effected by means of this device. In so doing, the additional ventilator can be switched on or off e.g. as a function of the temperature of the rectifier in the alternator.

BRIEF DESCRIPTION OF THE DRAWING

Embodiment examples of the invention are shown in the drawing and explained in more detail in the following description.

DETAILED DESCRIPTION OF THE PREFERRED EMBODIMENTS

Figure 1:
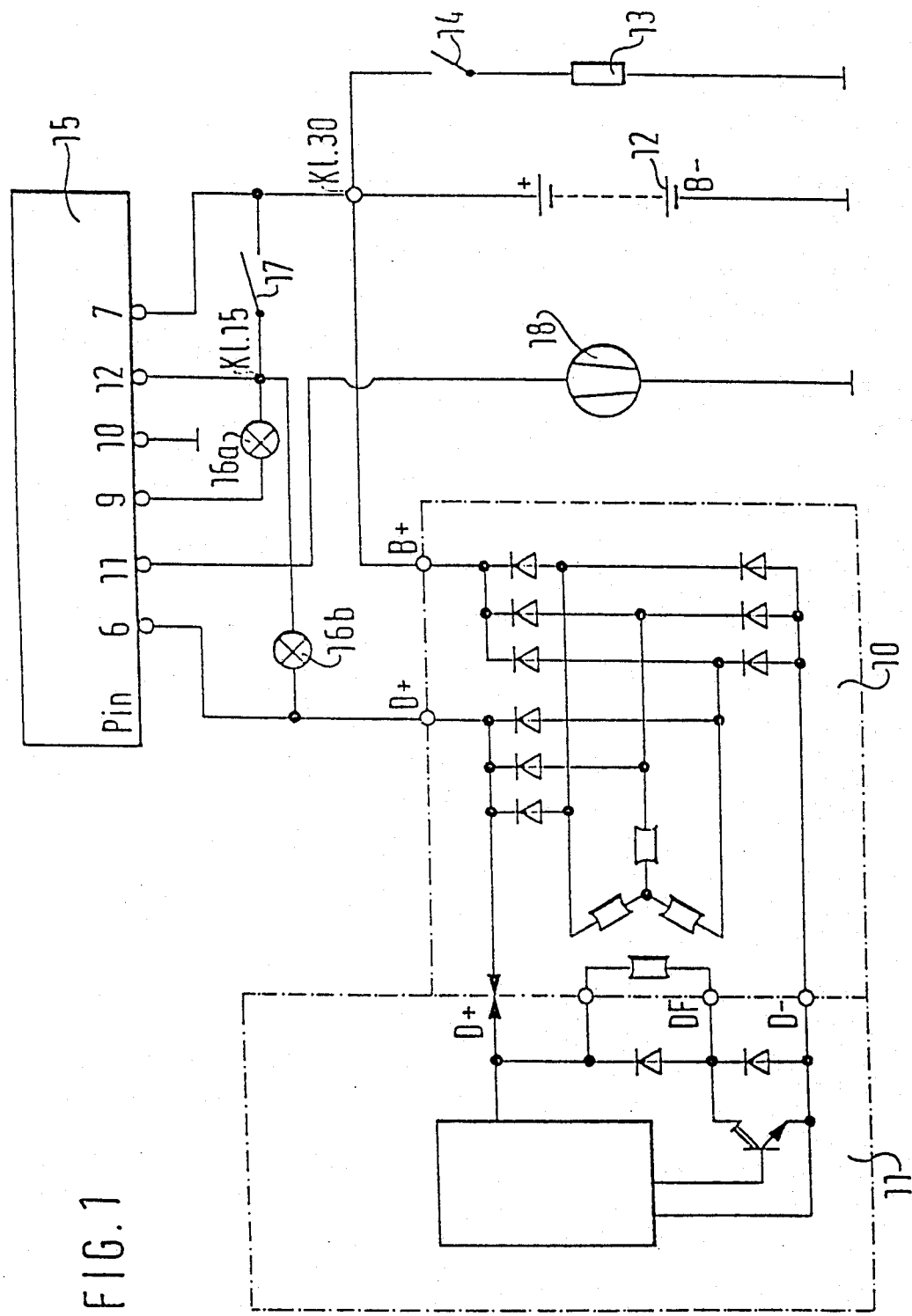
FIG. 1 shows a first embodiment example of the invention.

FIG. 1 shows a motor vehicle power supply with an alternator 10 which comprises terminals D—, DF, D+ and B+. The alternator 10 is connected with a voltage regulator 11 via the terminals D—, DF and D+. Terminal D— of the alternator 10 and voltage regulator 11 is connected to ground.

Another terminal K1.30 is connected to the terminal B+; the battery 12 lies between terminal K1.30 and ground, as do the consumers 13 which can be connected to terminal K1.30 or separated from terminal K1.30 via switch 14.

A device 15 for monitoring the ventilator, which contains twelve connection possibilities (pins), is connected via pin 6 with the alternator terminal D+, via pin 7 with terminal K1.30, and via pin 11 with the ventilator 18 which is provided for the alternator ventilation; the added ventilator 18 is also connected to ground.

Pin 9 of the device 15 for monitoring the ventilator is connected via a display light 16a with a terminal K1.15 which is connected in turn with a pin 12. A light emitting diode or an acoustic indicating device can also be provided instead of the display light 16a. The controller 17 is connected to the terminal K1.15 and also to terminal K1.30 and pin 7 of the device 15 for monitoring the ventilator. Moreover, a charge control light 16b is connected between the terminals K1.15 and D+.

Figure 2:
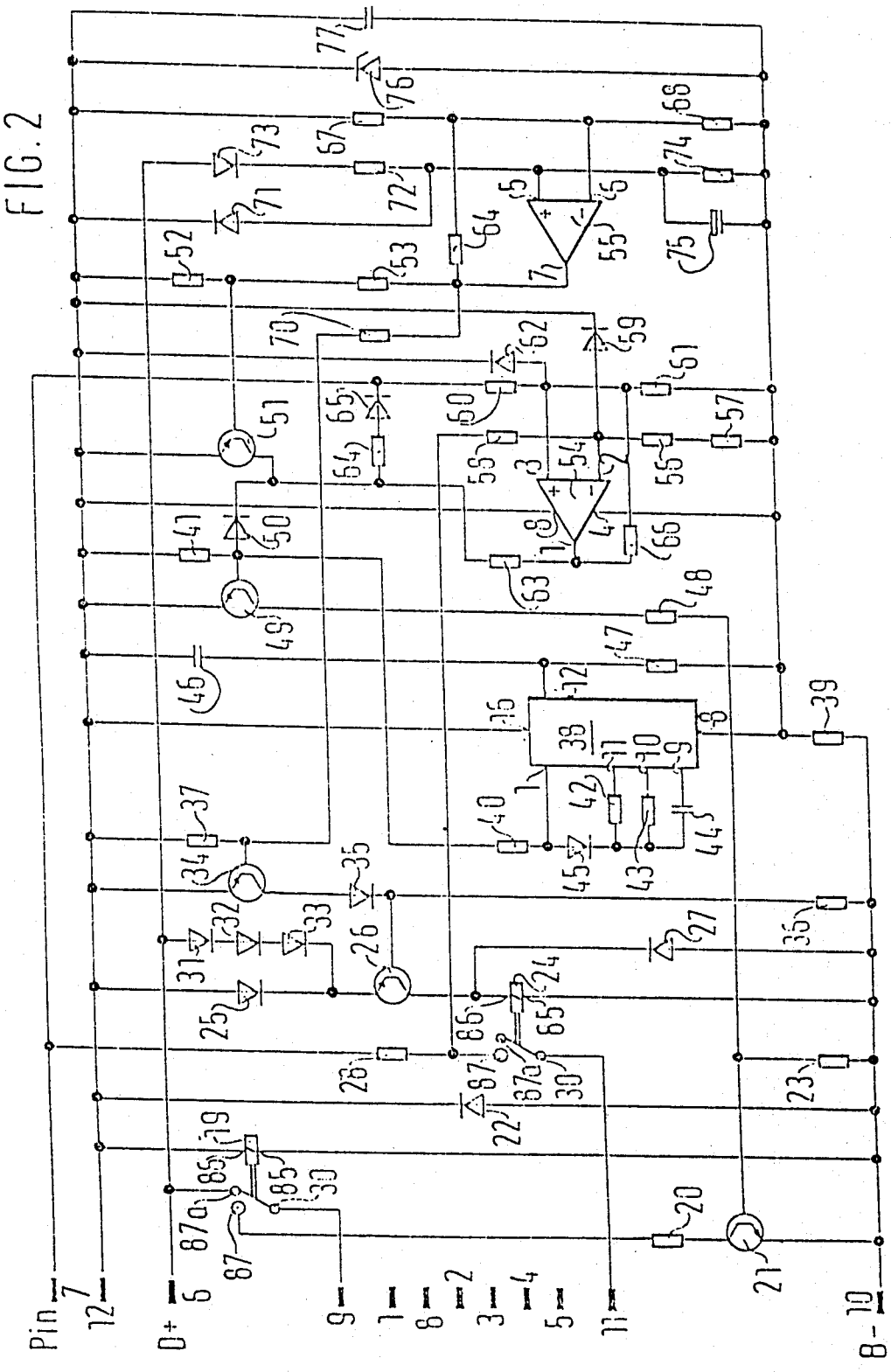
FIG. 2 shows the respective wiring diagram of the device for monitoring the ventilator.

The device 15 for monitoring the ventilator is shown in FIG. 2 as a detailed wiring diagram. As shown in FIG. 1, pins 1-12 of the device 15 for monitoring the ventilator are connected with terminals K1.30, K1.15, D+, D— as well as with the display light 16 and the additional ventilator 18; wherein the pins 1, 2, 3, 4, 5 and 8 are not engaged. B— is the negative pole of the battery connected to ground.

The wiring construction of the device 15 for monitoring the ventilator is as follows: pin 12 is connected with pin 10 via a relay 19 having contacts 30, 85, 86, 87a and 87. Pin 6 is connected via the contacts 87a and 30 with pin 9 when the relay is pulled up; when the relay is not pulled up, on the other hand, pin 9 is connected with pin 10 via contact 30 and contact 87, as well as the series connection of a resistor 20 and a transistor 21. A diode 22 lies between pin 12 and pin 10 parallel to the relay 19; moreover, a resistor 23 lies between the base of the transistor 21 and terminal 10.

Another relay 24 with terminals 30, 85, 86, 87a, 87 which serves to switch the ventilator 18 on and off is connected to pin 12 via a series connection of a diode 25 and a transistor 26 and further with pin 10 via contact 85. A diode 27 lies parallel to the relay 24.

When the relay 24 is pulled up, the ventilator 18 is connected to pin 7 via the contacts 30 and 87 of the relay 24 and a resistor 28. The series connection comprising three diodes 31, 32, 33 lies between pin 6 and the emitter of the transistor 26; these diodes are biased in the conducting direction.

The series connection of a transistor 34, a diode 35 and a resistor 36 are connected to the base of the transistor 26 in such a way that the emitter of the transistor 24 is connected with pin 12, the cathode of the diode 35 is connected with the base of the transistor 26 and the resistor 36 contacts the pin 10. Another resistor 37 lies between the base of the transistor 34 and the pin 12.

A first integrated circuit (IC) 38 is connected by its input E1 with pin 12 via the resistors 40, 41; input E16 is connected directly with pin 12, and the input E8 is connected to pin 10 via resistor 39. For the rest, 38 is connected with the resistors 42, 43, the capacitor 44 and the diode 45 which serve for adjusting the frequency of the oscillator of IC 38 and for stopping the oscillator. Another input of 38 is connected to pin 12 via the capacitor 46 and to pin 10 via the resistor 47 and the resistor 39.

A circuit branch leads from the base of the transistor 21 via a resistor 48 and a transistor 49 to pin 12 of the device 15 for monitoring the ventilator. The base of the transistor 49 is connected with pin 12 via a resistor 41 on the one hand and on the other hand with pin 12 via a diode 50 and the collector-emitter junction of another transistor 51, wherein the base of the transistor 51 is connected to the voltage divider 52, 53.

Another integrated circuit, which contains the two operational amplifiers 54 and 55, is connected to pin 10 via a resistor network. The connections of the two operational amplifiers 54 and 55 are as follows: the inverting input E2 of the operational amplifier 54 is connected via the resistors 56, 57 and 39 to pin 10, to pin 7 via the resistors 58 and 28, and to pin 12 via the diode 59. The noninverting input E3 of the operational amplifier 54 is connected to the voltage divider 60, 61 and, via the diode 62, to the pin 12. The output A1 of the operational amplifier 54 is connected with the transistor 51 via the resistor 63 and to pin 7 via the components 64 and 65. A feedback resistor 66 is located between the output A1 of the operational amplifier 54 and its input E3.

The operational amplifier 54 is connected to pin 12 and, via the resistor 39, to pin 10 for the power supply.

The operational amplifier 55 is connected by its inverting input E6 to the voltage divider 67, 68 and via resistors 69, 70 to the base of the transistor 34. The non-inverting input E5 of the operational amplifier 55 is connected to pin 12 via the diode 71 and to pin 6 via the resistor 72 and the diode 73. Further, the parallel connection of a resistor 74 and a capacitor 75 lies between the noninverting input of the operational amplifier 55 and the resistor 39.

A Zener diode 76 lies between pin 12 and pin 10 for stabilizing the supply voltage, a filter capacitor 77 is connected in parallel to this Zener diode 76.

The device 15 for monitoring the ventilator functions in the following manner: After switching on the controller 17, a self-diagnosis is first effected, in which a check is made as to whether or not the device 15 for monitoring the ventilator is itself operational, whether or not the connection lines are correctly connected, and whether or not the display light 16a is in an operative state. In the event that all checked elements are an in orderly state, the display 16 lights up for approximately two seconds after switching on the ignition or controller 17 and then goes out.

The ventilator is switched on as a function of the alternator voltage at D+. The functioning of the ventilator is checked by means of monitoring the current consumption. A display is effected when an interruption occurs in the line to the ventilator 18 or to the terminal K1.30 or when the current consumption of the additional ventilator 18 is too low, e.g. J 3A.

1. Diagnostic Test

After switching on the controller 17, voltage is applied to the pin 12 of the device 15 for monitoring the ventilator via terminal K1.15. The relay 19 switches over and connects contact 30 with contact 87, so that the display light 16 can be switched on and off via the transistor 21.

The oscillator contained in the integrated circuit 38 oscillates at a stable frequency which can be adjusted with the resistors 42 and 43 as well as the capacitor 44. A counter contained in the integrated circuit 38 begins to count and runs up. At the commencement of the counting, the counter output A1 of 38 lies at the low level L, transistor 49 and transistor 21 are therefore conducting and the display light 16 is illuminated.

After approximately two seconds, the output A1 of the integrated circuit 38 switches over to high level H, the transistors 49 and 21 are therefore in the blocking state and the display light 16a goes out. At the same time, the oscillator in the IC 38 is stopped via the diode 45.

When the controller 17 is switched on again, the counter contained in 38 is set to zero by means of a voltage pulse via the capacitor 46 at the input 12 of the IC 38 and the counting up begins in the counter from the beginning.

2. Cooling By Means of the Ventilator

When the voltage at terminal D+ of the alternator, which voltage is also applied to pin 6 of the device 15 for monitoring the ventilator, increases over a determined value so that the input voltage at the inverting input E6 at the operational amplifier 55 is greater than the input voltage at the noninverting input E5, the output A7 of the operational amplifier 55 then switches from L to H, the transistor 34 accordingly blocks, the transistor 26 simultaneously conducts and the relay 24 switches over, so that the additional ventilator 18 is supplied with voltage via the contacts 87 and 30 of the relay 24 and starts. Since transistor 51 simultaneously blocks, a lighting up of the display light 16a is enabled via the transistor 49.

As long as no voltage occurs at terminal D+, the conducting transistor 51 prevents a display. This occurs during starting.

3. Disturbance Indication

Disturbances are displayed during operation by means of the illumination of the display light 16a. In so doing, a number of different disturbances can be recognized and displayed.

3.1. Current Consumption of the Ventilator 18 Is Too Low

The operational amplifier 54 of IC2 compares the reference value and actual value of the applied voltages at its inputs E2 and E3. If the current consumption of the ventilator is too low as a result of defective operation, e.g. I<3 A, a voltage drop lying below the reference value takes place at the resistor 28. Therefore, a low signal L occurs at the output A1 of the operational amplifier 54, the transistors 49 and 21 are therefore in the conducting state and the display light 16a lights up and accordingly indicates the disturbance.

3.2. Interruption In The Line To The Ventilator 18

If an interruption occurs in the line to the ventilator 18, no more current can flow through the resistor 28, the voltage drop at the resistor 28 is therefore zero, the input voltage at the input E2 of the operational amplifier 54 is accordingly greater than the voltage at its input E3, a low signal therefore occurs at the output of the operational amplifier 54, the transistors 49 and 21 are therefore in the conducting state and the display element 16 lights up.

3.3. Defective Safety At The Terminal K1.30

If the safety at the terminal 30 fails as a result of a short circuit in the ventilator 18, the two relays 19 and 24 remain in the pulled in state. Therefore, a negative potential occurs at terminal 30, so that the two transistors 49 and 21 are put in the conducting state via the resistor 64 and the diode 65 and the display light 16a is made to display.

The device 15 for monitoring the ventilator contains a diode 76 which is connected between pin 12 and resistor 39 in the blocking state, the resistor 39 being connected in turn to the pin 10. This Zener diode has the object of stabilizing the supply voltage. The capacitors 75 and 77 are filter capacitors.

The diode 22 which lies between pin 12 and pin 10 serves to protect the circuit arrangement from negative voltage peaks. The additional diodes 59, 62 and 71 protect the inputs of the operational amplifier 54 and 55 from overvoltage.

Figure 3:
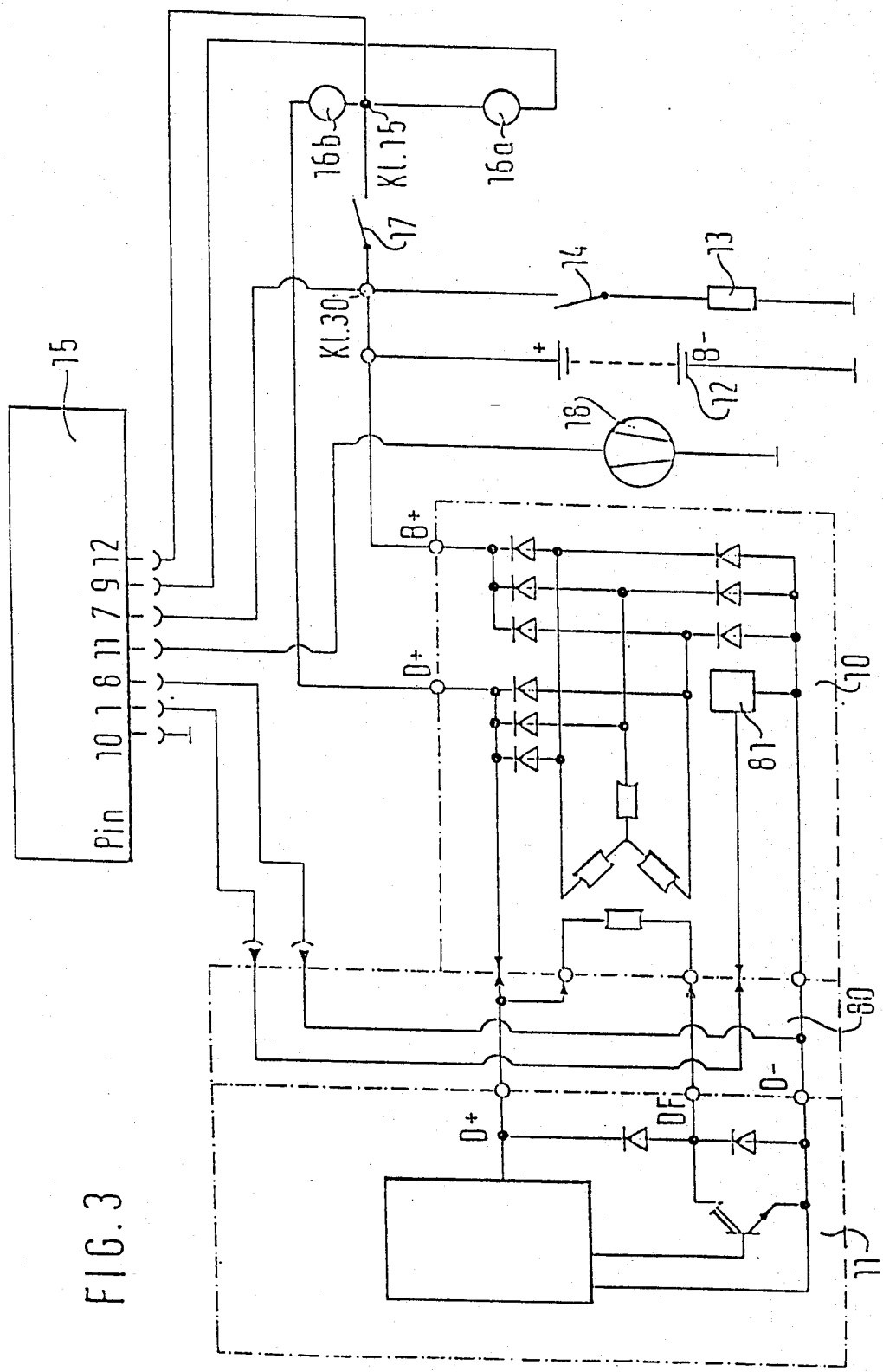
FIG. 3 shows a second embodiment example.

FIG. 3 shows the complete circuit diagram of another embodiment example. An alternator is designated by 10 and is connected, via brush holder 80, with a voltage regulator 11. A battery 12 is connected in the usual manner to the alternator as is consumer 13 via a switch 14. Further, the controller 17, whose second terminal is designated by K1.15, is connected to the positive pole of the battery 12 via a connection point K1.30.

The terminal K1.15 of the controller 17 is connected on one hand to a charge indicator 16b e.g. the charge control light and further to a function and error indicator 16a.

A device 15 for controlling and monitoring the ventilator with pins 1-12 is connected with the alternator power supply system, wherein the pins are engaged as follows: Pin 10 is connected to ground, pin 1 is connected with a connection of a temperature measuring device 81 assigned to the alternator 10. Pin 8 is connected with the alternator or regulator terminal D— and, further, with the other connection of the temperature measuring device 81. Pin 11 is connected to ground via an additional ventilator 18 which is provided for cooling the alternator with fresh air. Pin 7 is connected to terminal K1.30 of the controller 17, pin 9 is connected to the series connection of the two displays 16a and 16b which are connected in turn with the alternator terminal D+ and pin 12 is connected with terminal K1.15 of the controller 17. The pins 2, 3, 4, 5, 6 of the device 15 for controlling or monitoring the ventilator are not engaged.

Figure 4:
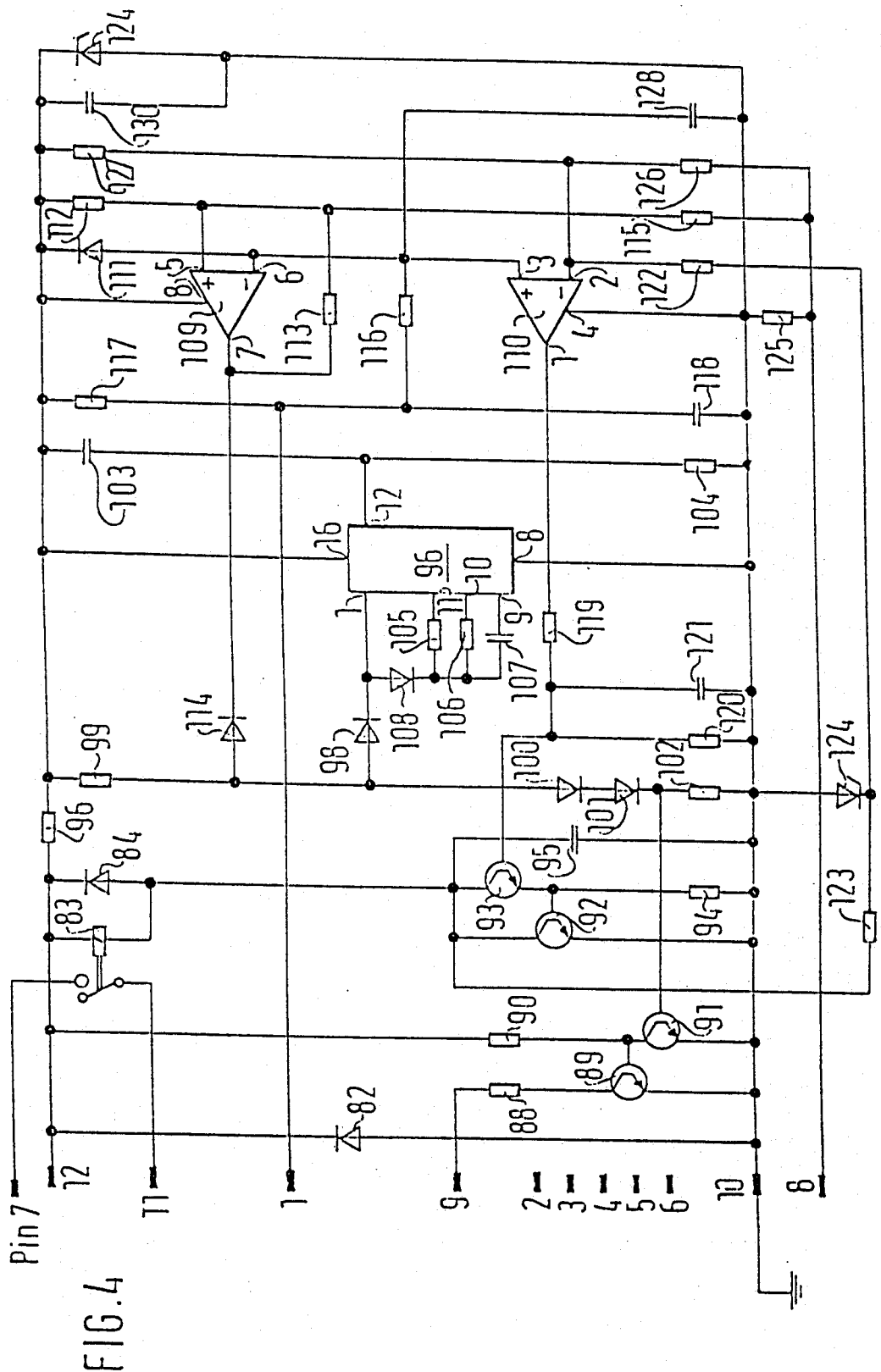
FIG. 4 indicates a wiring diagram of the device for controlling and monitoring the ventilator. Identical structural component parts are provided with the same reference numbers where advisable.

The device 15 for controlling or monitoring the ventilator is shown in a comprehensive wiring diagram in FIG. 4. A diode 82, which is to protect the circuit from negative voltage peaks, lies at the input of the device 15 for controlling and monitoring the ventilator between pins 12 and 10.

A relay 83 with the usual terminals 30, 85, 86, 87a, 87 is connected to the pins 7, 12 and 11 in such a way that pin 7 is connected with pin 11 when the relay is moved in and this connection is interrupted when the relay is moved out. A diode 84 lies parallel to the relay 83.

Pin 9 and pin 10 are connected via the series connection of a resistor 88 and a transistor 89, wherein the base of the transistor 89 is connected via another resistor 90 with pin 12 and via another transistor 91 with pin 10. Additional transistors 92, 93 are connected to the coil 85 of the relay 83, wherein the emitter of the transistor 93 is connected with the base of the transistor 92 and with pin 10 via a resistor 94.

A capacitor 95 lies parallel to the collector-emitter junction of the transistor 92.

An integrated circuit 96 with 16 input and output connections is wired as follows: Input E16 is connected via resistor 97 with pin 12, output A1 is connected via diode 98 and resistor 99 with resistor 97 and via diodes 100 and 101 and resistor 102 with pin 10, E8 is connected directly with pin 10, and E12 is connected to the connection point of a capacitor 103 and a resistor 104 which are connected in turn between pin 12 and pin 10.

The integrated circuit 96 contains, among others, an oscillator whose frequency is determined by means of the resistors 105, 106 and the capacitor 107, wherein these components are connected to the inputs 11, 10, 9 and, via a diode 108, with output A1 of the integrated circuit 96.

Another integrated circuit which comprises the operational amplifiers 109 and 110 is connected as follows: The inverting input E6 of the operational amplifier 109 is connected with pin 12 via a diode 111 and the resistor 97 and, moreover, is connected directly with the noninverting input E3 of the operational amplifier 110. The noninverting input of the operational amplifier 109 is connected with the resistor 97 via a resistor 112, with the output A7 and a diode 114 via a resistor 113, and with pin 8 via another resistor 115.

The noninverting input of the operational amplifier 110 is connected via a resistor 116 between a resistor 117 and a capacitor 118. The output A1 of the operational amplifier 110 is guided, via a resistor 119, to the base of the transistor 93, the parallel connection of a resistor 120 and a capacitor 121 is connected between the resistor 119 and pin 10.

The inverting input E2 of the operational amplifier 110 is connected with the collector of the transistor 92 via the series connection of two resistors 122 and 123, a Zener diode lies between the connection point of the resistors 122 and 123 and terminal 10 for protecting against overvoltage.

A connection leads from pin 8, via a resistor 125, to the input E4 of the operational amplifier 110 and further via a resistor 126 to the inverting input E2 of the operational amplifier 110 and via a resistor 127 and the resistor 97 to the pin 12.

A filter capacitor 128 lies between the noninverting input E3 of the operational amplifier 110 and its input E4. A Zener diode 129 with parallel connected capacitor 130 is connected to the pin 10 on one side and, via the resistor 97, to the pin 12 on the other side.

The circuit arrangement of the embodiment example 2, according to FIGS. 3 and 4, functions in the following manner: After switching on the ignition switch 17, a self-diagnosis first takes place. A check is made as to whether or not the circuit of the device 15 for controlling or monitoring the ventilator is itself in an operative state and whether or not the connection lines and display light are in an operative state. When the system is operative the display light 16 lights up for approximately two seconds after the ignition or controller 17 is switched on, and then goes out.

The ventilator 18 is accordingly switched on or off as a function of the temperature of the rectifier in the alternator. The following operating states are provided:

| | | |
|---|---|---|
| at temperatures | <134° C.: | ventilator constantly off. |
| at temperatures of 134° C. | −154° C.: | ventilator in timed operation. |
| at temperatures | >154° C.: | ventilator constantly on. |
| at temperatures | >165° C.: | excess temperature, display 16 lights up. |

In a defective system, e.g. if a sensor line is interrupted, the display light 16 lights up directly. In a defective ventilator 18, the display light 16 lights up only after exceeding a determined temperature threshold.

In the event that a connector plug falls out, the light remains switched off continuously, also during the diagnostic test, this error can therefore be recognized immediately in the diagnostic test.

1. DIAGNOSTIC TEST

When switching on the controller 17, voltage is applied to pin 12 via terminal K1.15 of the controller 17. The transistor 89 conducts via the resistor 90, so that the display light 16a between the terminal K1.15 and pin 9 lights up.

The oscillator of the integrated switching circuit IC 96 oscillates at a stable frequency which is adjusted by means of the resistors 105, 106 as well as the capacitor 107. The counter which is integrated in the IC 96 therefore runs up.

At the commencement of counting, the counter output A1 is at low level L, therefore the current is guided from the resistor 99 via the diode 98 to negative. After approximately two seconds, the counter reaches a predetermined value and the IC 96 switches over at output A1 to high level H, the transistor 91 is accordingly conducting via the resistor 99, diodes 100, 101 and transistor 89 blocks. The display light 16 goes out and the oscillator in the IC 96 is stopped via the diode 108.

When the controller 17 is switched on again, the counter integrated in the IC 96 is set to zero by means of a voltage pulse via capacitor 103 at the input E12 of the IC 96 and the counting up of the counter begins from the beginning.

2. COOLING (VENTILATOR RUNNING)

The measurement sensor 81 at the rectifier in the alternator 10 applies a voltage to the input E3 of the operational amplifier 110 via the resistors R117 and R116 in proportion to the temperature. If the voltage at the input E3 is greater than the voltage E2 of the operational amplifier 110, the transistors 92 and 93 are conducting via the resistor 119, the relay 83 retracts and the ventilator starts, wherein the current flows from pin 7 via contact 87a and contact 30 to pin 11.

3. DISTURBANCE INDICATION (LIGHTING UP OF THE DISPLAY LIGHT 16 DURING OPERATION)

If the ventilator 18 fails as a result of a defect, the voltage increases at input E6 of the operational amplifier 109. If the voltage at input E6 is greater than the voltage at the input E5, the current is derived via resistor 99 and diode 114 at output A7 of the operational amplifier 109 to negative. Transistor 91 therefore blocks and the transistor 89 conducts; therefore, a current flows from pin 9 through resistor 88 and the transistor 89 to pin 10, so that the display light 16 lights up.

On the other hand, if the connector for the temperature sensor 81 falls out, the additional ventilator 18 runs, but the display 16 lights up.

The following devices are provided for protection against voltage peaks and for improving the characteristics of the device 15 for controlling and monitoring the ventilator 15: The diode 82 serves for protection against negative voltage peaks, diode 129 serves for stabilizing the supply voltage. The other diodes 111 and 124 protect the inputs of the operational amplifiers 109 and 110 from overvoltage, the diode 124 is realized as a Zener diode.

The resistor 122 determines the hysteresis of the operational amplifier 110 in the ventilator operation, and the capacitors 118 and 128 are supposed to filter the measuring voltage.

While the invention has been illustrated and described as embodied in an alternator with a ventilator and a device for controlling and/or monitoring the ventilator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In an alternator with a ventilator, particularly a three-phase alternator for a motor vehicle, the ventilator being structured and positioned so as to produce an air flow of the ventilator to cool the alternator, and the ventilator being electrically connected to the alternator so as to be supplied with voltage by the alternator, the improvement comprising a device (15) for controlling and monitoring the ventilator (18), said device (15) being electrically connected with the ventilator (18).

2. The improvement as defined in claim 1, wherein the device (15) for at least one of controlling and monitoring the ventilator (18) has means for self-checking in operation and has means for displaying (16) disturbances in operation of the ventilator.

3. The improvement as defined in claim 2, wherein said means for self-checking is structured so as to check said device each time a controller (17) is switched on and to terminate said checking after a predetermined time period.

4. The improvement as defined in claim 2, further comprising mean to produce oscillator pulses in a timed manner and wherein the predetermined time period is determined by counting the oscillator pulses.

5. The improvement as defined in claim 1, further comprising means for producing a signal which depends on a temperature in the alternator, said means for producing a signal being electrically connected to the device for at least one of controlling and monitoring the ventilator (15), and the device is structured to control the ventilator (18) according to the temperature signal.

6. The improvement as defined in claim 5, wherein said means for producing a signal which depends on a temperature in the alternator includes a temperature sensor (81) fastened at the alternator.

7. The improvement as defined in claim 2, further comprising an additional display means (16a) provided for displaying errors in operation of the device.

8. In an alternator with a ventilator, particularly a three-phase alternator for a motor vehicle, the ventilator being structured and positioned so as to produce an air flow of the ventilator to cool the alternator, and the ventilator being electrically connected to the alternator so as to be supplied with voltage by the alternator, the improvement comprising a device (15) for at least one of controlling and monitoring the ventilator (18), said device (15) being electrically connected with the ventilator (18), said device (15) having means for self-checking in operation and having means for displaying (16) disturbances in operation of the ventilator.

9. The improvement as defined in claim 8, wherein said means for self-checking is structured so as to check said device each time a controller (17) is switched on and to terminate said checking after a predetermined time period.

10. The improvement as defined in claim 8, further comprising mean to produce oscillator pulses in a timed manner and wherein the predetermined time period is determined by counting the oscillator pulses.

11. The improvement as defined in claim 8, further comprising means for producing a signal which depends on a temperature in the alternator, said means for producing a signal being electrically connected to the device for at least one of controlling and monitoring the ventilator (15), and the device is structured to control the ventilator (18) according to the temperature signal.

12. The improvement as defined in claim 11, wherein said means for producing a signal which depends on a temperature in the alternator includes a temperature sensor (81) fastened at the alternator.

* * * * *